United States Patent
Caviness

(10) Patent No.: US 11,687,229 B2
(45) Date of Patent: *Jun. 27, 2023

(54) DYNAMIC USER INTERFACE BASED ON INPUT CLASSIFICATIONS

(71) Applicant: HULU, LLC, Santa Monica, CA (US)

(72) Inventor: William Caviness, Seattle, WA (US)

(73) Assignee: HULU, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,335

(22) Filed: Jun. 10, 2022

(65) Prior Publication Data

US 2022/0300130 A1    Sep. 22, 2022

Related U.S. Application Data

(63) Continuation of application No. 17/018,358, filed on Sep. 11, 2020, now Pat. No. 11,379,111.

(51) Int. Cl.
| | | |
|---|---|---|
| *G06F 3/0487* | (2013.01) | |
| *G06F 3/04842* | (2022.01) | |
| *G06F 3/0483* | (2013.01) | |
| *G06F 3/0481* | (2022.01) | |
| *G06F 40/103* | (2020.01) | |
| *G06F 18/24* | (2023.01) | |

(52) U.S. Cl.
CPC .......... *G06F 3/0487* (2013.01); *G06F 3/0481* (2013.01); *G06F 3/0483* (2013.01); *G06F 3/04842* (2013.01); *G06F 18/24* (2023.01); *G06F 40/103* (2020.01)

(58) Field of Classification Search
None
See application file for complete search history.

(56) References Cited

U.S. PATENT DOCUMENTS

| | | |
|---|---|---|
| 9,507,480 B1 | 11/2016 | Hui et al. |
| 2004/0032430 A1 | 2/2004 | Yung et al. |
| 2004/0034646 A1 | 2/2004 | Kimball et al. |
| 2006/0253798 A1 | 11/2006 | Raghavan et al. |
| 2009/0319946 A1 | 12/2009 | Boyer et al. |
| 2011/0214067 A1 | 9/2011 | Tanaka |
| 2013/0290856 A1 | 10/2013 | Beveridge et al. |
| 2014/0210693 A1 | 7/2014 | Bhamidipati et al. |
| 2015/0066653 A1 | 3/2015 | Mengle et al. |
| 2018/0048679 A1 | 2/2018 | Huang et al. |
| 2020/0143808 A1 | 5/2020 | Hwang et al. |
| 2022/0083187 A1 | 3/2022 | Caviness |

*Primary Examiner* — Mandrita Brahmachari
(74) *Attorney, Agent, or Firm* — Kwan & Olynick LLP

(57) ABSTRACT

In some embodiments, a method receives an input for a user interface and determines whether an input classification that classifies the input in one of a plurality of input classifications is included with the input. When the input classification is not included with the input, performing: determining an input classification for the input and sending the determined input classification and the input to a server system. When the input classification is included with the input, sending the input and the input classification that is included with the input to the server system. Then, the method receives a user interface format that is based on the input classification from the server system and causes output of content in the user interface format on the user interface.

20 Claims, 12 Drawing Sheets

DYNAMIC USER INTERFACE BASED ON INPUT CLASSIFICATIONS

CROSS-REFERENCE TO RELATED APPLICATIONS

This application is a continuation of, and claims priority to, co-pending and commonly assigned U.S. patent application Ser. No. 17/018,358 by Caviness, titled DYNAMIC USER INTERFACE BASED ON INPUT CLASSIFICATION, filed on Sep. 11, 2020, which is hereby incorporated by reference in its entirety and for all purposes.

BACKGROUND

An application may receive different types of input from a user via multiple input devices. For example, the input may be via voice, touch, recognition (e.g., face or gesture recognition), and/or a remote control. Typically, the user may choose which input to use in different situations and different users may have different preferences on which inputs to use in the different situations. For example, some users may prefer to use a voice input and some users may prefer to use a touch input when they are close to a device. Also, some users may prefer to use a remote control when they are further away from a device and some users may prefer to use a voice input at that time.

A device may detect a proximity of the user to the device. Then, the device may alter the user interface based on the proximity of the user to the device. For example, the proximity-based method may attempt to predict which type of input a user will use if the user is close to the device or far away from the device. However, as discussed above, different users may prefer to use different inputs in different situations. Thus, the predicted user interface may not be the most efficient interface for the upcoming input.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a dynamic user interface system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A system may receive multiple types of input from a user. As discussed above, the multiple input types may include voice input, touch input, remote control input, and/or recognition input, but other inputs may also be appreciated. A user interface may be dynamically configured differently when using the different input types, such as to promote ease of use based on how the different inputs are used. For example, entities on a user interface may need to be spaced out to avoid accidental selections of the entities when using touch inputs. Also, the entities that are configured for touch input may be larger than entities that can be selected by remote controls. Additionally, using voice commands may be difficult when a user does not know what to say for a command. Further, when using a remote control, a selection state is required, such as a selector that indicates where the selection will be performed. The above is a non-exhaustive list, but just examples of issues that may occur when multiple types of input are received.

Typically, an application may receive an input from an input device. However, the application does not know what type of input was received. As discussed in the Background, a device may use a different type of detection, such as proximity detection, to adapt the user interface. However, as discussed in the Background, the predicted interface may not be an accurate prediction of what input the user may want to perform. Accordingly, some embodiments assign an input classification to the inputs that are received. Then, an application user interface (UI) decision service can determine which user interface format to use based on the input and the input classification. For example, if an input is flagged as a voice input, then the application UI decision service can determine a format for the user interface based on the voice input classification. In some examples, the application may use a user interface format that is optimized for voice input. The decision is based on the input classification for an input, which may provide a more accurate prediction of a user interface format for receiving a next input on the user interface.

System Overview

Figure 1:
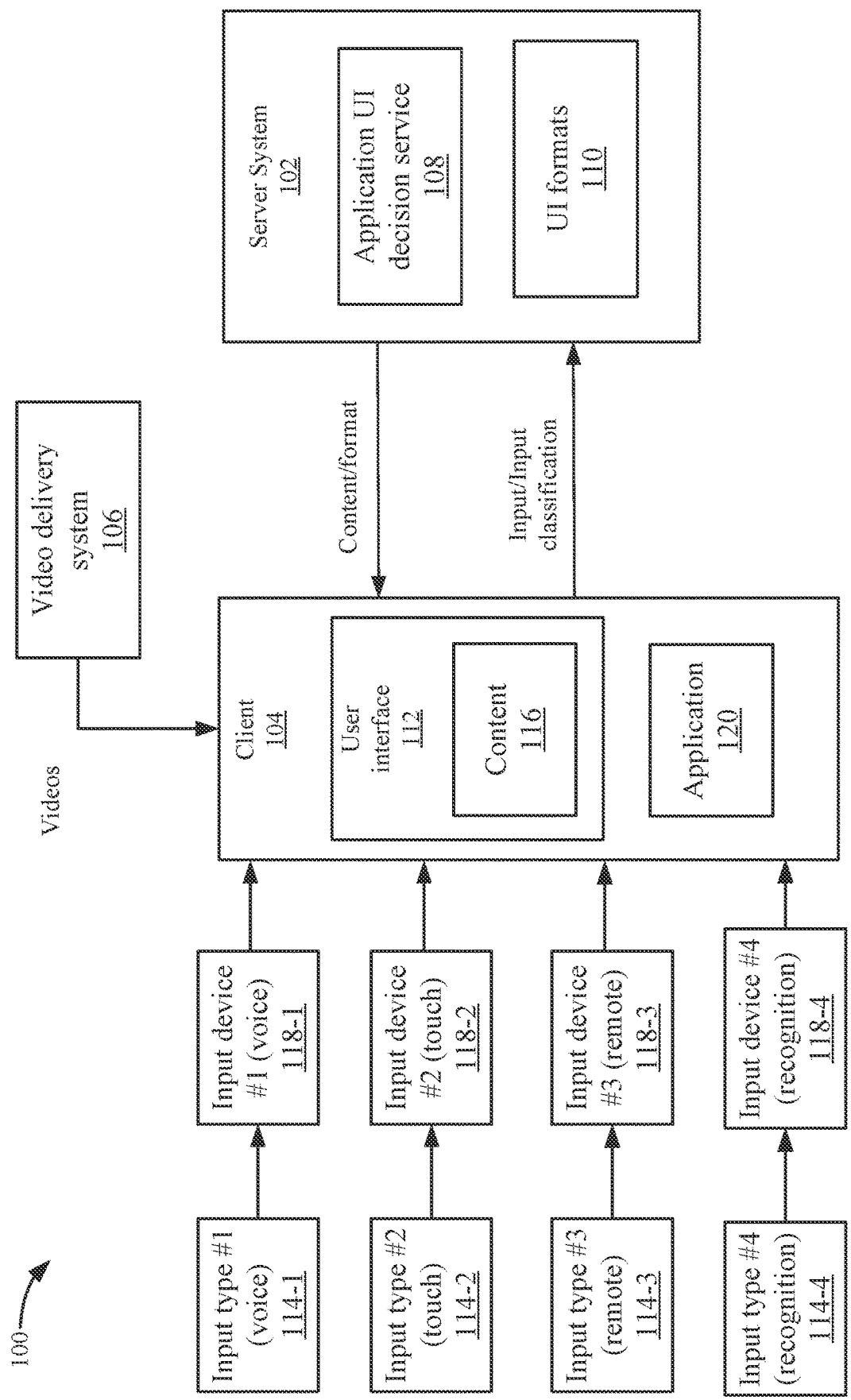
FIG. 1 depicts a simplified system for generating a dynamic user interface according to some embodiments.

FIG. 1 depicts a simplified system 100 for generating a dynamic user interface according to some embodiments. System 100 includes a server system 102, a client 104, and a video delivery system 106. Although a single client 104 and server system 102 are described, it will be understood that multiple clients 104 may be appreciated and server system 102 may include multiple computing devices that perform the functions described. A video delivery service may use video delivery system 106 to deliver videos to client 104. Video delivery system 106 may be a content delivery network (CDN) that includes multiple computing devices that can deliver videos and other content to client 104. Although video delivery may be discussed, the use of input classifications may be used with different types of user interfaces that may or may not be associated with video delivery.

Client 104 may include different computing devices, such as smartphones, living room devices, personal computers, tablet devices, cellular mobile phones, etc. Client 104 may include an application 120 that may generate a user interface 112 that displays content 116. In some embodiments, application 120 includes a media player that is displayed in a user interface 112 to playback the videos. User interface 112 may also display other content 116, such as an interface to search or browse for videos to play, but other content 116 may be provided in user interface 112. User interface 112 may receive inputs, such as inputs to browse content 116 to select videos to play. As will be discussed in more detail below, content 116 may be displayed in different formats by application 120.

Input devices 118-1 to 118-4 (input devices #1 to #4) may receive input from a user or other computing devices. Although separate input devices 118 are shown for different input types, it will be understood that an input device 118 may receive multiple types of input. In some embodiments, input device #1 118-1 may be configured to receive a voice input. For example, input device #1 118-1 may include a speaker that can detect audio. Input device #2 118-2 can detect touch inputs. For example, input device 118-2 may include a touch screen or other touch-sensitive device that detects a touch input. Input device #3 118-3 may be a remote control that receives input from a user. The remote control may be a device that sends commands to application 120 or server system 102. Input device #4 118-4 receives recognition-type input. For example, input device 118-4 may include a camera that may detect video or images of a user. The images may be used to detect gestures, perform facial recognition, or perform other recognition actions. Also, input devices 118 may be integrated with client 104 or be separate from client 104. For example, input device #3 118-3 may be a remote control that is a separate device from client 104. As another example, input device #1 118-1 may be an integrated speaker in client 104.

Client 104 may receive different input types 114-1 to 114-4. An input type #1 114-1 may be an audio input, which may be received via a user speaking a command. Input type #2 114-2 may be a touch input, which may be received via a physical touch from a user. Input type #3 114-3 may be from a remote control. Input type #4 114-4 may be a recognition type input. The recognition type input may receive images or video that can be used recognize items, such as a gesture or a facial expression.

The input may be classified with an input classification that describes the input type. In some embodiments, the input classification may be a flag that identifies the input type. For example, the flag may include different values that identify the input types of voice, touch, remote control, and recognition. In some examples, the values of "1" for voice, "2" for touch, "3" for remote, and "4" for recognition may be used, but it will be recognized that multiple different methods may be used. For example, the input classification may identify the input device, such as a home voice speaker, living room device, remote control. In this case, the input classification may be a device identifier, which can be used to infer the input classification. For example, input from a home voice speaker may be considered a voice input type.

In some embodiments, input devices 118 may receive the input type and provide the input to client 104. Input devices 118 may then add the input classification to the input. For example, the input may be sent with a flag that identifies the input classification. In other examples, client 104 may receive the input from input device 118 and then determine the input classification. For example, client 104 may determine that the input received from an integrated speaker may be classified with the input classification of voice. Different methods of determining the input classification may be appreciated.

In some embodiments, input devices 118 may send the input and input classification to client 104, and client 104 forwards the input and input classification to server system 102. For example, application 120 may receive the input and input classification from input device 118 via an application programming interface (API). Then, client 104 forwards the input and input classification to server system 102. In other embodiments, input device 118 may send the input and input classification to server system 102 directly without involving client 104. For example, input device 118 may use an API to send the input and input classification to server system 102. In some examples, the remote control may use an API to provide the command to client 104 and/or server system 102. Client 104 may also process the input without involving server system 102. The discussion will describe the input and input classification being sent from client 104 to server system 102, but it will be recognized that variations may be appreciated.

Server system 102 may receive the input and input classification. Then, in response to the input and input classification, server system 102 determines content 116 to display in user interface 112 and a format for displaying content 116. Server system 102 may include a server side application that determines the content 116 to display. For example, the input may cause a page to be displayed by application 120. In some examples, each UI format 110 may be associated with a different page of content 116.

An application UI decision service 108 may determine which format to display content 116 in response to the input and input classification. Application UI decision service 108 may use the input classification differently to select a UI format 110. For example, application UI decision service 108 may predict which UI format 110 based on the input classification. Also, application UI decision service 108 may use a user account defined setting based on the input classification. For example, a user account may set a preferred UI format 110 for an input classification or pattern of input classifications. Further, application UI decision service 108 may determine a UI format 110 based on logic that is not personalized to the user account. For example, application UI decision service 108 may be set to use a UI format 110 for all user accounts when a voice input is used.

UI formats 110 may be associated with different input types 114. Each UI format 110 may format content 116 differently. Also, different UI formats 110 may include display different content 116 for the same input. That is, in some embodiments, content 116 may be the same for different UI formats 110, but just formatted differently. In other embodiments, content 116 may be different for each UI format 110. For example, content 116 may include voice prompts for the voice UI format 110, but no voice prompts for the remote control UI format 110. Also, the remote control UI format 110 may include a selector to show which entity may be selected while the voice UI format 110 may not include a selector.

After application UI decision service 108 determines the UI format 110 for content 116, server system 102 sends content 116 (or instructions on which content 116 to display) and the UI format 110 to client 104. Application 120 then displays content 116 using the UI format 110. In some embodiments, application 120 may receive content 116 with the formatting information and format content 116 for display in user interface 112. In some embodiments, the same content 116 is used for UI formats 110 and then application 120 applies different formatting information to content 116. In some cases, application 120 may not use all the content 116 that is sent if the content is not applicable to the associated UI format 110. In other embodiments, each UI format 110 may be associated with specific content 116. Application 120 receives the specific content 116 and displays content 116 using the specified UI format 110. Although content 116 is described as being sent by server system 102, client 104 may have received content 116 prior to the input from server system 102 (or from another device). Server system 102 may send instructions to client 104 that specifies which content 116 to display.

UI Format Configuration

Figure 2:
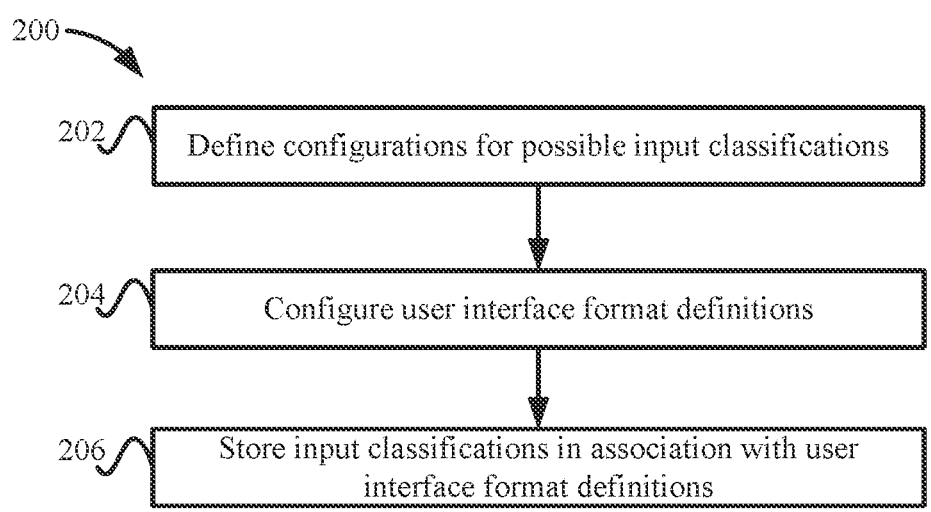
FIG. 2 depicts a simplified flowchart of a method for configuring input classifications for user interface format definitions according to some embodiments.

FIG. 2 depicts a simplified flowchart 200 of a method for configuring input classifications for user interface format definitions according to some embodiments. At 202, server system 102 defines configurations for possible input classifications. As discussed, above, input classifications may be assigned different flags. For example, the configuration may define an identifier that is used to identify the input type.

At 204, server system 102 configures user interface format definitions for UI formats 110. The UI format definitions may include formatting information for pages displayed in user interface 112. A page may be a collection of content that is displayed by application 120. The formatting information may define how to format a page for each different UI format 110. The format definitions may also define which content 116 may be displayed for a page. For example, each UI format 110 may display different content, such as the voice UI format includes voice command prompts, but other UI formats do not.

At 206, server system 102 stores input classifications in association user interface format definitions. For example, a different version of a page may be associated with a respective input classification. In some embodiments, the user interface format definitions may include instructions on how to render content for the page differently. For example, the instructions may take content for a page and select which content should be displayed in a format.

After the configuration of input classifications and UI format definitions, inputs may be classified by input devices 118.

Input Classification and Processing

Figure 3A:
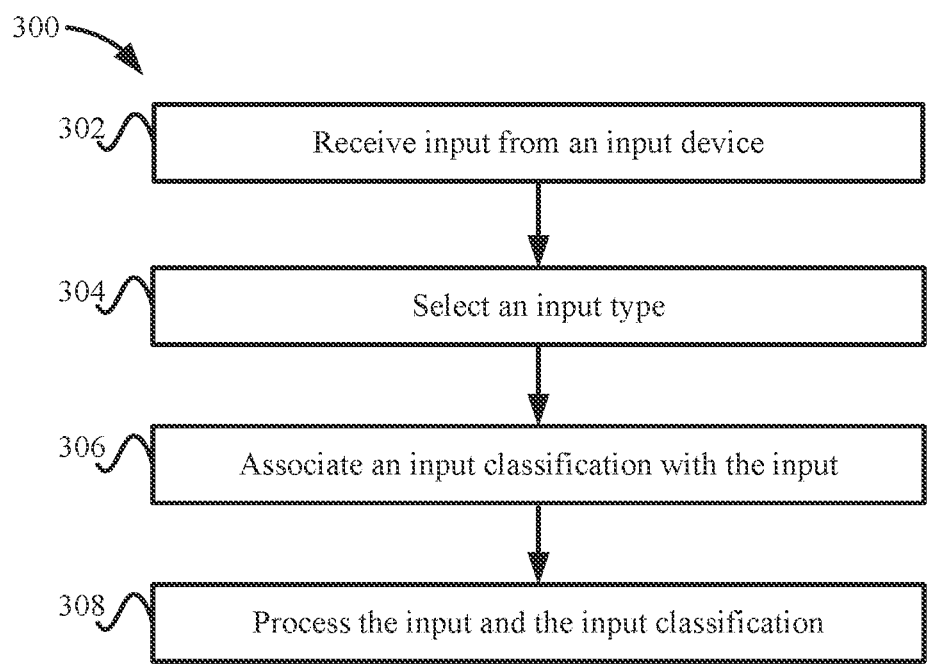
FIG. 3A depicts a simplified flowchart of a method for processing input according to some embodiments.

FIG. 3A depicts a simplified flowchart 300 of a method for processing input according to some embodiments. Although the following will be described with respect to input device 118, it is noted that some functions may be performed by input device 118, client 104, and/or server system 102. For example, FIG. 3B describes an example of processing at client 104. At 302, input device 118 receives input from a user. The input may be received via one of input devices 118-1 to 118-4.

At 304, input device 118 selects an input type. In some examples, input device 118 may only receive one type of input and may not need to select an input type. However, input device 118 may receive multiple types of input and selects the input type based on which input is received. Input device 118 may select the type of input based on which interface the input is received. The interface may be a connection to an input device 118, such as a physical connection or an API. For example, a speaker may be associated with a first interface to receive a voice input and a touch interface is associated with a second interface to receive a touch input.

At 306, input device 118 associates an input classification with the input. For example, input device 118 may add information to classify the input type of the input, such as by adding metadata to the input that is received. In some examples, input device 118 may add a flag to the input defining which type of input was received.

At 308, input device 118 sends the input and the input classification. In some examples, input device 118 sends the input and input classification to client 104. In other examples, input device 118 sends the input and input classification to server system 102 for processing.

Figure 3B:
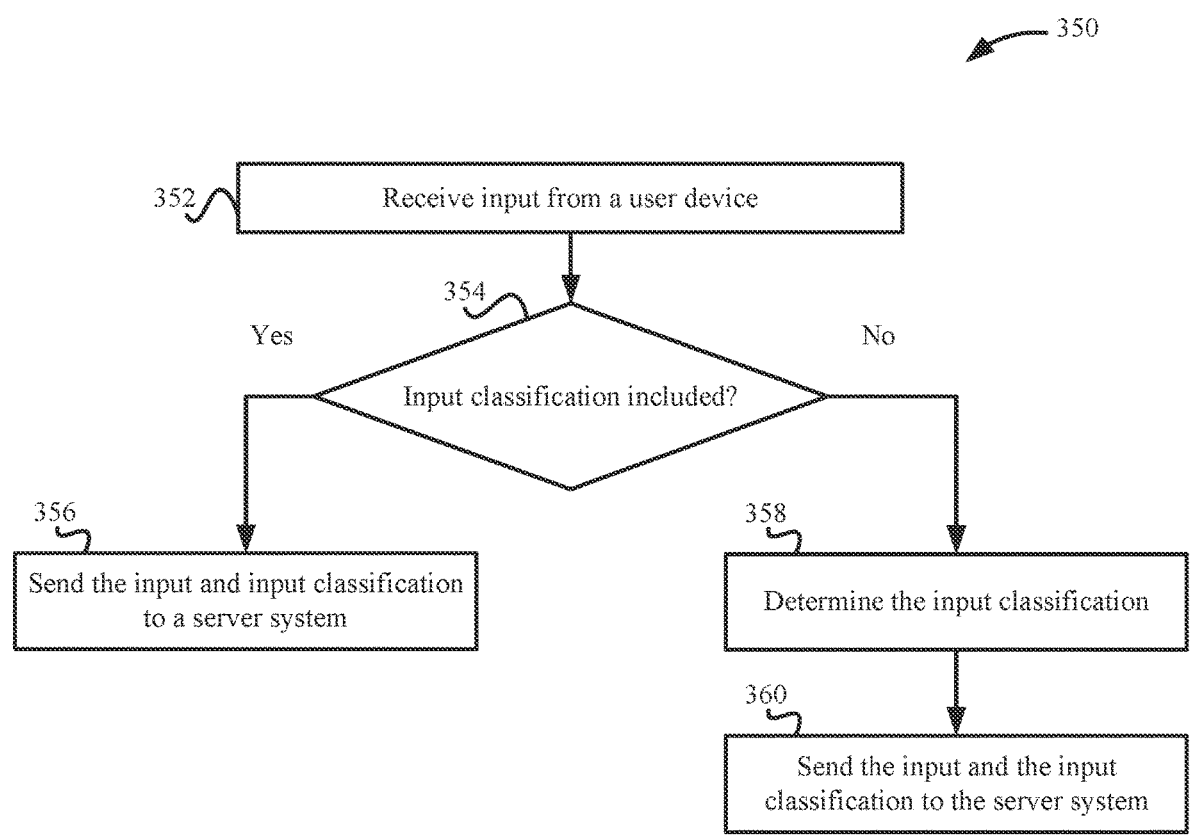
FIG. 3B depicts a simplified flowchart of a method for processing input at a client according to some embodiments.

In some embodiments, client 104 processes the input and input classification or may generate the input classification for the input. FIG. 3B depicts a simplified flowchart 350 of a method for processing input at client 104 according to some embodiments. At 352, client 104 receives input from a user device 118. The input may be received via one of input devices 118-1 to 118-4.

Input device 118 may or may not have included an input classification. At 354, client 104 determines whether an input classification is included with the input. If the input classification is included, at 356, client 104 may send the input and input classification to server system 102. However, it is possible that client 104 may process the input without communicating with server system 102. If client 104 processes the input without communicating with server system 102, then client 104 does not send the input and the input classification to server system 102, but rather may dynamically alter user interface 112 according to the input and input classification. When dynamic alteration is used, the UI format may be dynamically changed after an input is received.

If the input classification is not included, at 358, client 104 determines the input classification. Client 104 may determine the input type using different methods. For example, client 104 detects the input type from the input device that was used to determine which input classification to use. For example, if the input is received from input device #1, then client 104 associates a voice input classification with the input because input device #1 is associated with the voice input type. Or, if the input is received from input device #2, then client 104 associates a touch input classification with the input because input device #2 is associated with the touch input type. When an input device 118 may receive multiple types of input, client 104 may use other information to determine the input classification, such as using the interface in which the input is received where different interfaces are used to send different input types, analyzing the content or format of the input, using metadata associated with the input, etc. For example, client 104 may analyze the content to determine the content is voice. Also, metadata may indicate the input is from a particular device type.

At 360, client 104 send the input and the input classification to server system 102. If client 104 processes the input without communicating with server system 102, then client 104 does not send input and input classification to server system 102, but rather may dynamically alter user interface 112 according to the input and input classification.

UI Format Processing

Figure 4:
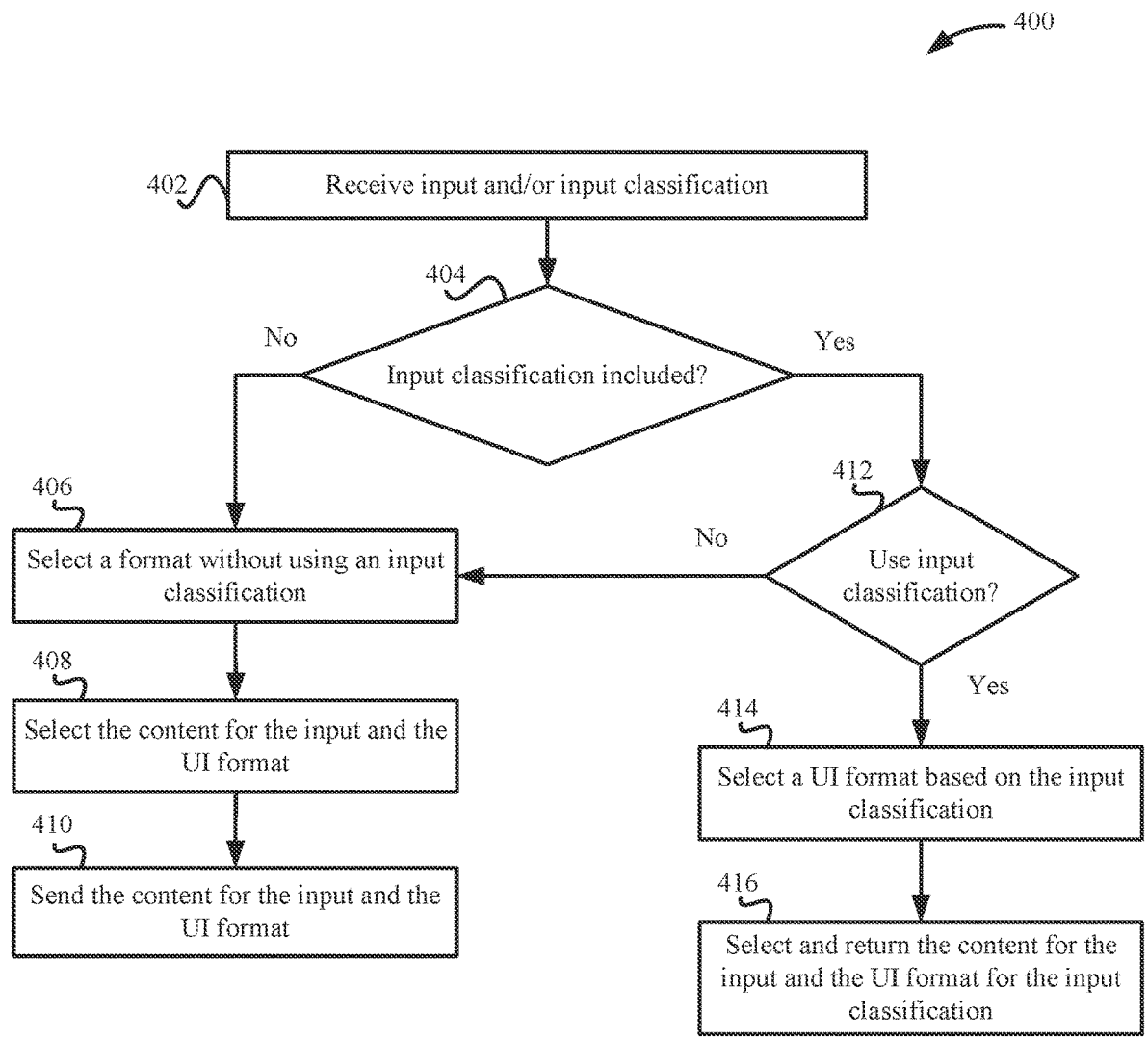
FIG. 4 depicts a simplified flowchart of a method for processing an input and/or input classification according to some embodiments.

Accordingly, instead of receiving just an input, the system associates an input classification with that input. The input and input classification may then be processed to determine which UI format 110 to use to display content 116 on user interface 112. This dynamically changes the UI format 110 based on the input and the input classification. FIG. 4 depicts a simplified flowchart 400 of a method for processing an input and/or input classification according to some embodiments. It is possible that an input classification may or may not be received. For example, some input devices 118 may not include an input classification or not all inputs may be associated with input classifications. At 402, application UI decision service 108 receives an input and/or input classification. At 404, application UI decision service 108 determines if an input classification is included. If not, at 406, application UI decision service 108 selects a UI format 110 without using an input classification. For example, application UI decision service 108 may use a default UI format 110. In other embodiments, as will be discussed in more detail below, application UI decision service 108 may select a predicted UI format 110 that may most likely be desired by a user. At 408, server system 102 selects content 116 for the input and the associated UI format 110. As discussed above, different pages of content 116 may be used for different UI formats 110. At 410, server system 102 sends content 116 and UI format 110 to client 104. In some embodiments, server system 102 may not send the actual content 116. For example, client 104 may have access to content 116 and server system 102 sends instructions as to which content 116 to display. Server system 102 may send UI format 110 in metadata associated with content 116, or in other ways, such as by identifying UI format 110 within content 116.

If an input classification is included with the input, at 412, application UI decision service 108 determines if it should use the input classification. For example, application UI decision service 108 may not always use the input classifications for different reasons. In some examples, application UI decision service 108 may not want to continuously change the format of user interface 112 and after a format change occurs, application UI decision service 108 may wait until after a time period elapses to perform another change. Also, different types of inputs that are received may not use input classifications, such as some commands may not require UI format changes (e.g., playback commands). If application UI decision service 108 does not use an input classification, the process proceeds to 406 where application UI decision service 108 selects a format without using the input classification as described above. However, if an input classification will be used, at 414, application UI decision service 108 selects a UI format 110 based on the input classification. The selection may be performed by selecting a corresponding UI format 110 to the input classification. However, other methods may be used, such as predicting the behavior of the user and determining a UI format 110 that might be used in the future. Also, a user account setting may associate a UI format 110 with an input classification or a UI format 110 may be used that is standard across multiple user accounts. This process will be described in more detail in FIG. 5.

At 416, application UI decision service 108 selects and returns content 116 for the input with the selected UI format 110 for the input classification.

In some examples, application UI decision service 108 may predict a UI format 110. For example, application UI decision service 108 may predict a UI format 110 when an input classification is not received. However, even if an input classification is received, application UI decision service 108 may predict a UI format 110. That is, even though a specific input type is received, application UI decision service 108 may still predict which UI format 110 to use based on the input type, which may mean the UI format 110 may not directly correspond to the input type that is received.

Figure 5:
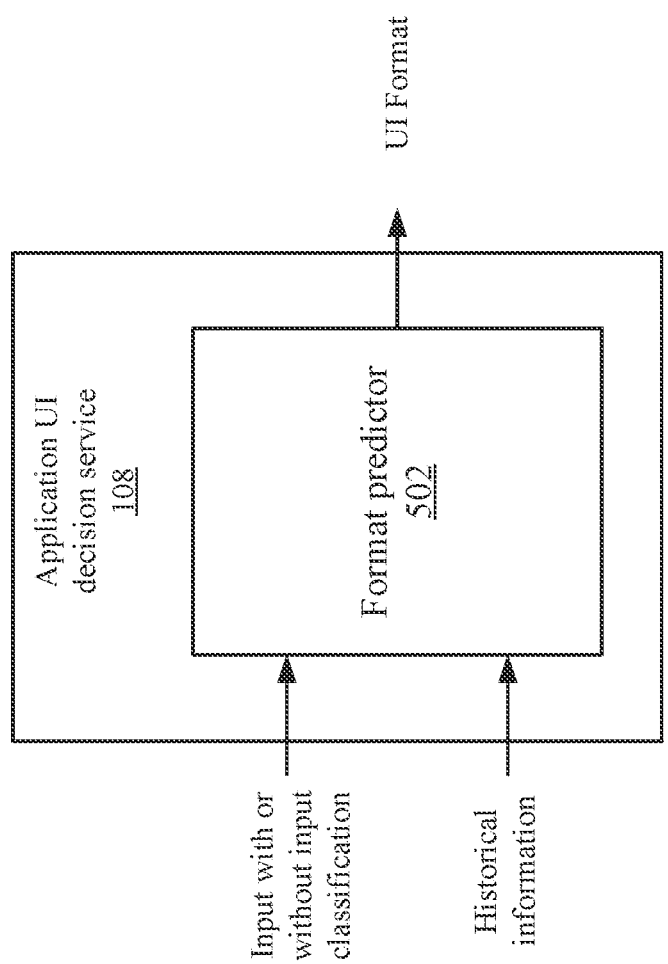
FIG. 5 depicts a more detailed example of an application user interface (UI) decision service for predicting a UI format according to some embodiments.

FIG. 5 depicts a more detailed example of application UI decision service 108 for predicting a UI format 110 according to some embodiments. A format predictor 502 may predict a UI format 110. Format predictor 502 receives an input that may or may not be associated with an input classification. Also, format predictor 502 receives historical information. The historical information may include previous input classifications that were received and/or UI formats 110 that were determined. Other historical information may also be used, such as a user's general preference or the UI format 110 generally used by the user.

Format predictor 502 may include various logic to determine a UI format 110 based on the input received with or without the input classification. In some embodiments, format predictor 502 may include rules that are used to predict UI format 110. In other examples, format predictor 502 may include a prediction network, such as a neural network, that is trained to predict a UI format 110. The rules may include recency rules or frequency rules that determine whether an input classification should result in a specific UI format. For example, if the most recent UI format 110 is voice and a recognition input classification is received, format predictor 502 may decide to use the voice UI format 110 again. However, if the voice UI format 110 is being used, but the touch UI format 110 has been used previously, when a touch UI format 110 is received, format predictor 502 may switch to a touch UI format 110 because it may be more likely that the user will use a touch input again. For example, the user may be close to an input device 118 and had only used the voice input once and will go back to using touch inputs. Also, if the most frequent inputs (e.g., frequency over time) are mostly remote control inputs, but a voice input is received, format predictor 502 may continue to use the remote control UI format 110. This is because the user may have decided to use voice for one command but will continue to use the remote control input type in the future.

A prediction network may be trained with data for a user (or other users) to predict a UI format 110. When the input, input classification, and historical information is received, the prediction network outputs a prediction of a UI format 110.

User Interface Generation

Figure 6:
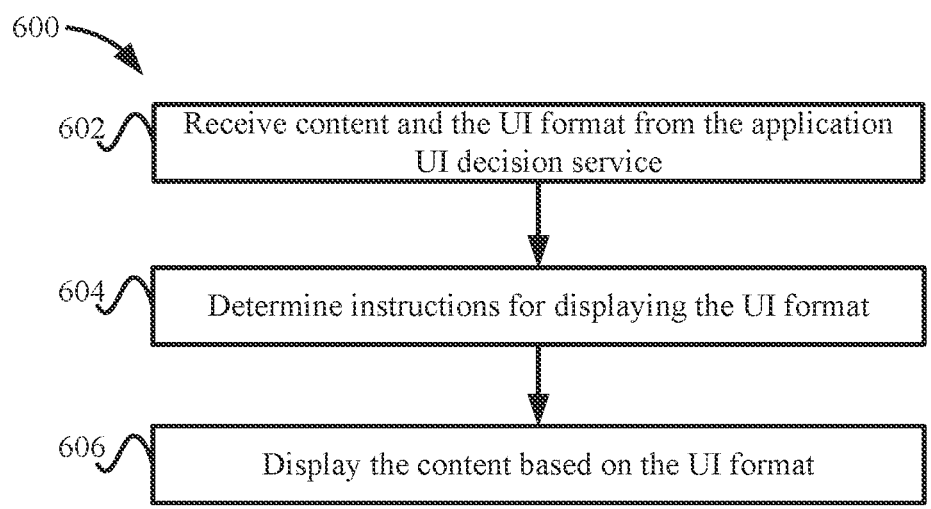
FIG. 6 depicts a simplified flowchart of a method for generating a user interface according to some embodiments.

FIG. 6 depicts a simplified flowchart 600 of a method for generating user interface 112 according to some embodiments. At 602, application 120 receives content 116 and the UI format from application UI decision service 108. As discussed above, application 120 may receive the actual content 116 to display. Also, application 120 may receive instructions on which content 116 to display, such as from content stored at client 104. For example, the content 116 for a page may have been previously downloaded to application 120. Application 120 determines the content for the user interface version associated with UI format 110. In some examples, if a voice UI format is provided, then application 120 retrieves the content for the page associated with a voice UI format.

At 604, application 120 determines instructions for displaying the associated UI format 110. The instructions may direct application 120 to display content 116 using specified formatting. For example, the instructions may state where to display content, and what other formatting attributes to use, such as color, shape, size, etc.

At 606, application 120 displays content 116 in user interface 112 based on UI format 110. User interface 112 may display content 116 with different features that are designed for the input type. The following will describe different user interface versions that could be displayed based on the input type.

Figure 7:
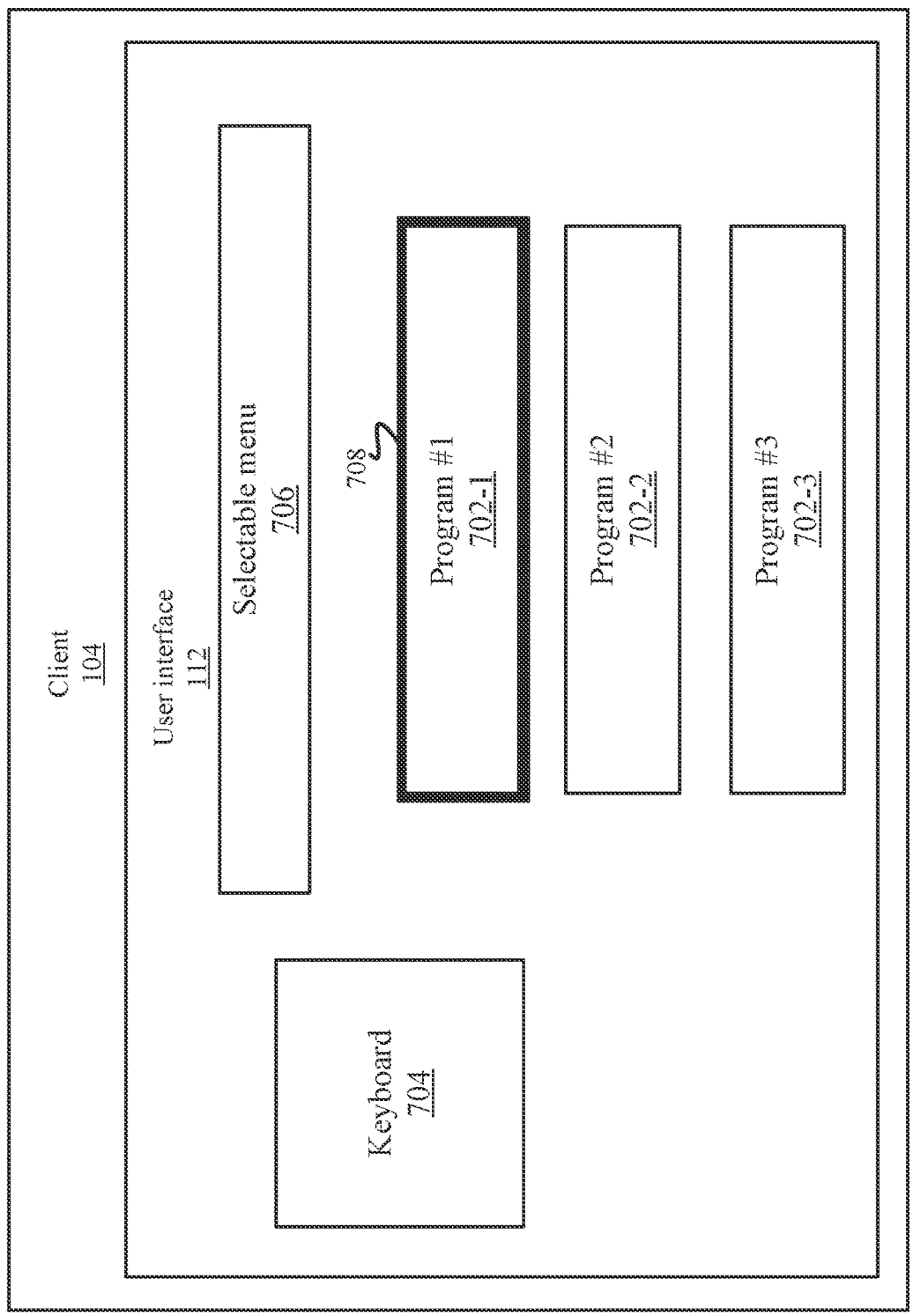
FIG. 7 depicts an example of a user interface for a remote control input according to some embodiments.

FIG. 7 depicts an example of user interface 112 for a remote control input according to some embodiments. User interface 112 includes different entities 702-1 to 702-3 that could be selected by a user to play different programs (e.g., videos). Also, user interface 112 includes a keyboard 704, which may include characters that can be selected by the remote control to provide this input. An example may be a keyboard of letters of A, B, C, and so on. Also, user interface 112 includes a selectable menu 706 which may include different categories.

In some examples, user interface 112 may be displaying a search interface for a remote control. The previous input may have been to display a search page using a remote control or a search query from the remote control may have been input. Keyboard 704 may be used to input a search query. Selectable menu 706 may include different categories that can be selected by a user to display different search results. Also, since this is a remote control UI format 110, a selector 708 is included that highlights which entity from user interface 112 will be selected if a selection is made using the remote control.

Figure 8:
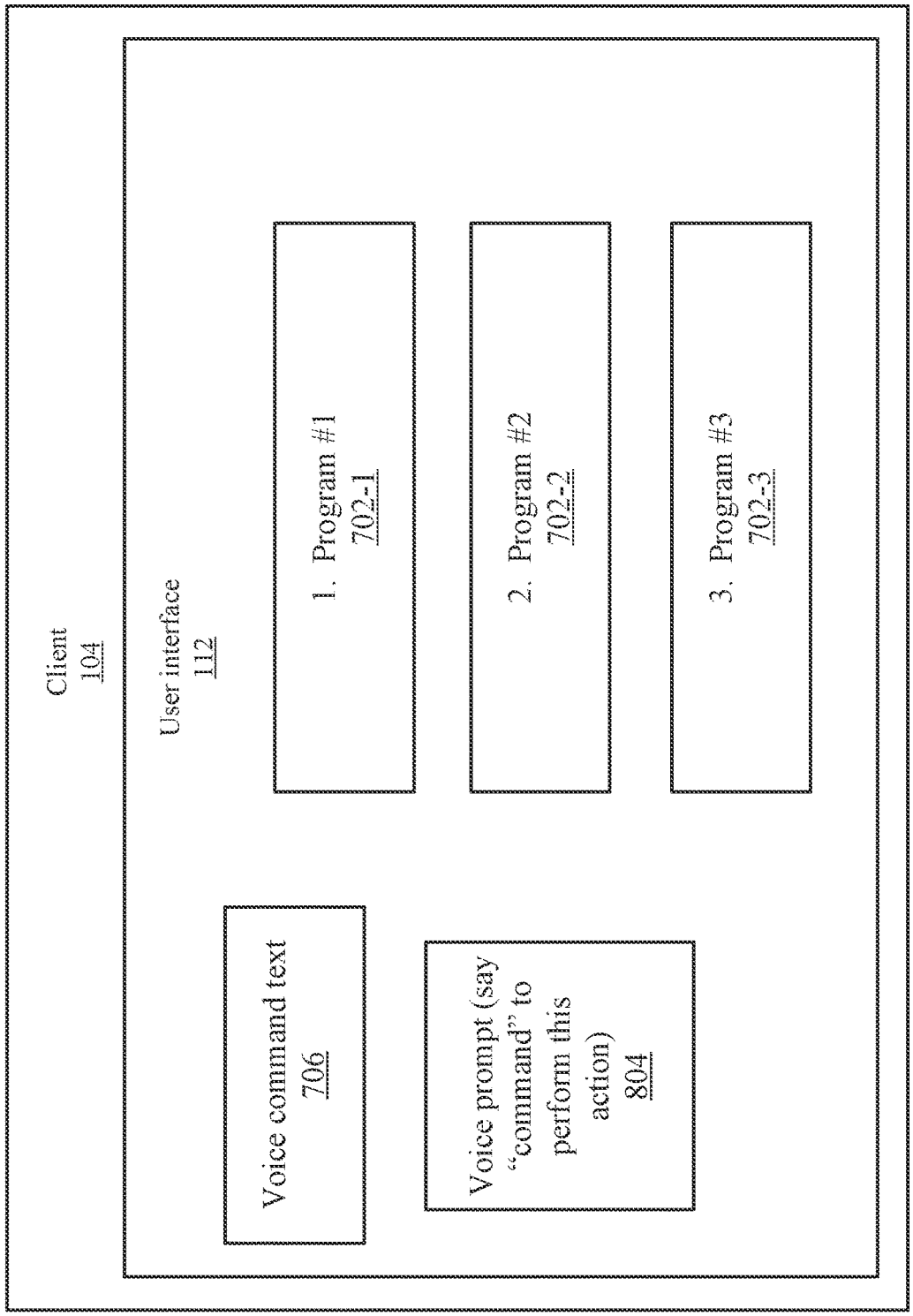
FIG. 8 shows an example of a user interface for a voice UI format according to some embodiments.

FIG. 8 shows an example of user interface 112 for a voice UI format according to some embodiments. User interface 112 may be adapted to be more conducive to voice inputs once a voice command is issued. For example, a voice search may be search for comedies and entities 702-1 to 702-3 for programs are displayed. Instead of using a selector, each program may be identified with identifiers such that a user can quickly provide another command for the program. For example, the numbers 1, 2, 3, etc. may be associated with the search results. A voice command may then be received that identifies an entity "1" instead of a user having to speak the entire program name. To allow the user to see which voice command is performed, user interface 112 may display voice command text 706, which displays the text of one or more recent voice commands. The user can check the text to determine whether the correct voice command was processed.

Also, voice prompts may be provided on user interface 112 to guide a user on which commands could be used. For example, at 804, a voice prompt that may indicate a "command" to perform an action may be displayed. Voice prompts may guide the user as to which possible voice inputs could be used.

Figure 9:
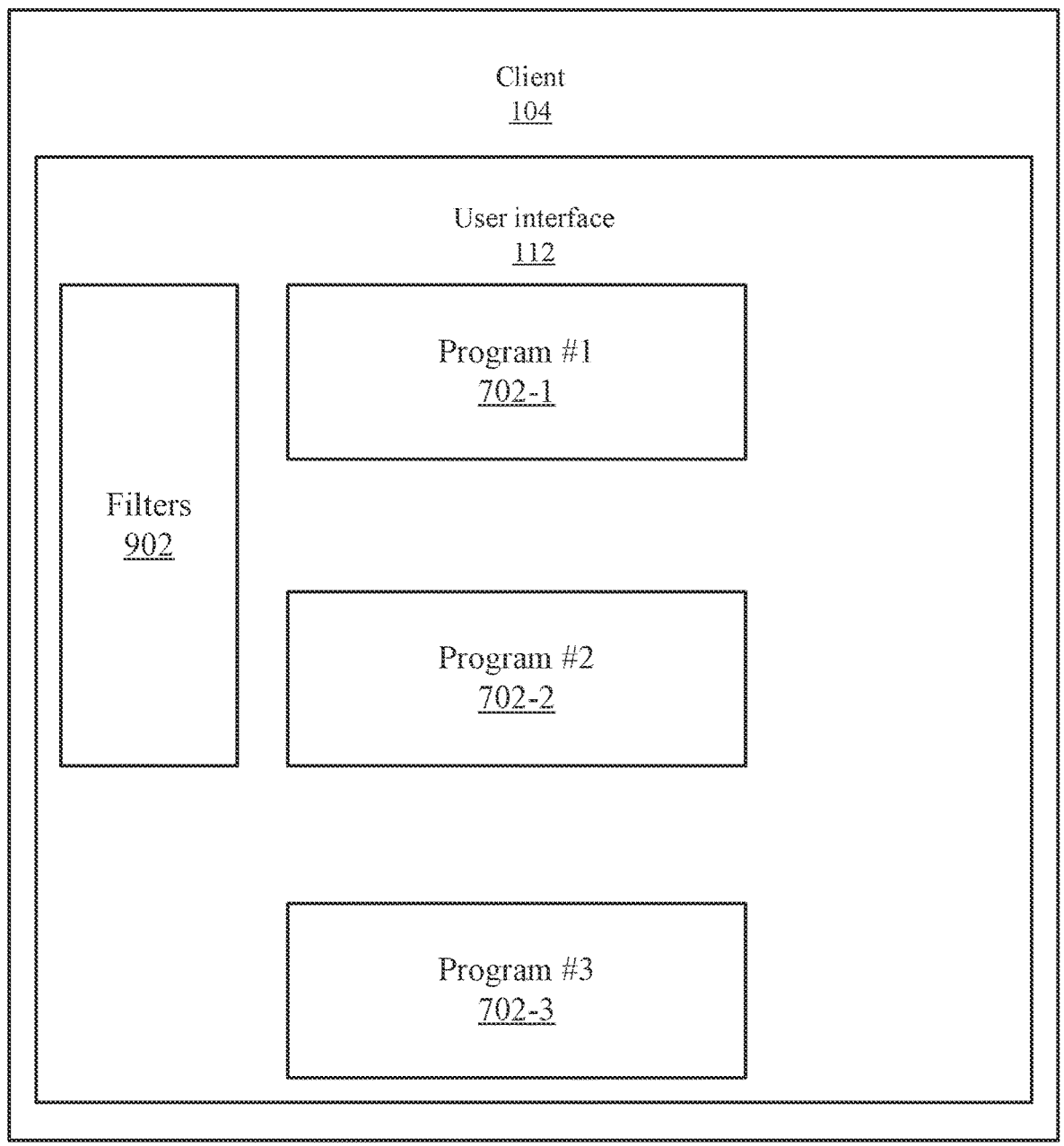
FIG. 9 depicts an example of a user interface for a touch UI format according to some embodiments.

FIG. 9 depicts an example of user interface 112 for a touch UI format according to some embodiments. When a touch input is received, there may be problems when a user touches multiple entities on user interface 112 because they are spaced too close together. Accordingly, user interface 112 may space out entities for programs 702-1 to 702-3 on user interface 112. Also, the entities may be larger than that used for voice commands or remote control commands to provide more area for entities to be selected. Filters 902 may be selected to filter content on user interface 112.

User interfaces 112 may thus be formatted differently with different content and different features. Because user interfaces 112 are directed to the input type, a user may find user interface 112 to be easier to use when providing a next input.

CONCLUSION

Accordingly, user interface 112 may be adapted based on an input and an input classification. By classifying inputs that are received based on input type, content 116 of a user interface 112 may be dynamically adapted to provide features that may be more likely to be used by a user. By using the input classification from an input that is received, a more accurate prediction of what user interface format a user may use next is provided. The prediction may be better than using other methods of detecting which format to use, such as using proximity detection only. The use of a user interface format that is tailored to a way a user may provide a next input improves user interface 112. For example, inputs received via user interface 112 may be more convenient for a user to use. Also, errors may be minimized when receiving inputs on user interface 112 that is tailored to a most probable input to be received by the user.

EXAMPLE EMBODIMENTS

In some embodiments, a method comprising: receiving, by a computing device, an input for an application in which content is displayed in a user interface; receiving, by the computing device, an input classification that classifies the input in one of a plurality of input classifications; selecting, by the computing device, a user interface format from a plurality of user interface formats based on the input classification; selecting, by the computing device, content for the user interface format; and causing, by the computing device, output of the content in the user interface format on the user interface.

In some embodiments, the plurality of input classifications correspond to a plurality of input types.

In some embodiments, the plurality of input classifications correspond to a plurality of input devices in which input is received.

In some embodiments, different input devices are associated with different input classifications in the plurality of input classifications.

In some embodiments, the input classification is received from an input device that received the input.

In some embodiments, the input classification is added to the input to identify an input type.

In some embodiments, each interface format in the plurality of user interface formats is associated with an input classification in the plurality of input classifications.

In some embodiments, selecting the content for the user interface format comprises: determining a page of content from a plurality of pages of content that is associated with the user interface format, wherein each page of content in the plurality of pages of content is associated with a user interface format in the plurality of user interface formats.

In some embodiments, the content for the user interface format is selected from eligible content for the input, wherein each user interface format in the plurality of user interface formats selects different content from the eligible content.

In some embodiments, the plurality of pages of content comprise different content, wherein each of the plurality of pages of content can be output for the input.

In some embodiments, the user interface format includes instructions for displaying the content on the user interface.

In some embodiments, selecting the user interface format comprises: predicting the user interface format based on the input classification and historical information of received input classifications.

In some embodiments, selecting the user interface format comprises: predicting the user interface format based on the input classification and a setting defined for a user account using the user interface.

In some embodiments, selecting the user interface format comprises: predicting the user interface format based on the input classification and logic defined by a service that provides the content for the user interface.

In some embodiments, the method further comprising: sending the content and the user interface format to the application.

In some embodiments, a non-transitory computer-readable storage medium containing instructions, that when executed, control a computer system to be operable for: receiving an input for an application in which content is displayed in a user interface; receiving an input classification that classifies the input in one of a plurality of input classifications; selecting a user interface format from a plurality of user interface formats based on the input classification; selecting content for the user interface format; and causing output of the content in the user interface format on the user interface.

In some embodiments, selecting the content for the user interface format comprises: determining a page of content from a plurality of pages of content that is associated with the user interface format, wherein each page of content in the plurality of pages of content is associated with a user interface format in the plurality of user interface formats.

In some embodiments, the content comprise for the user interface format is selected from eligible content for the input, wherein each user interface format in the plurality of user interface formats selects different content from the eligible content.

In some embodiments, the plurality of pages of content comprise different content, wherein each of the plurality of pages of content can be output for the input.

Figure 10:
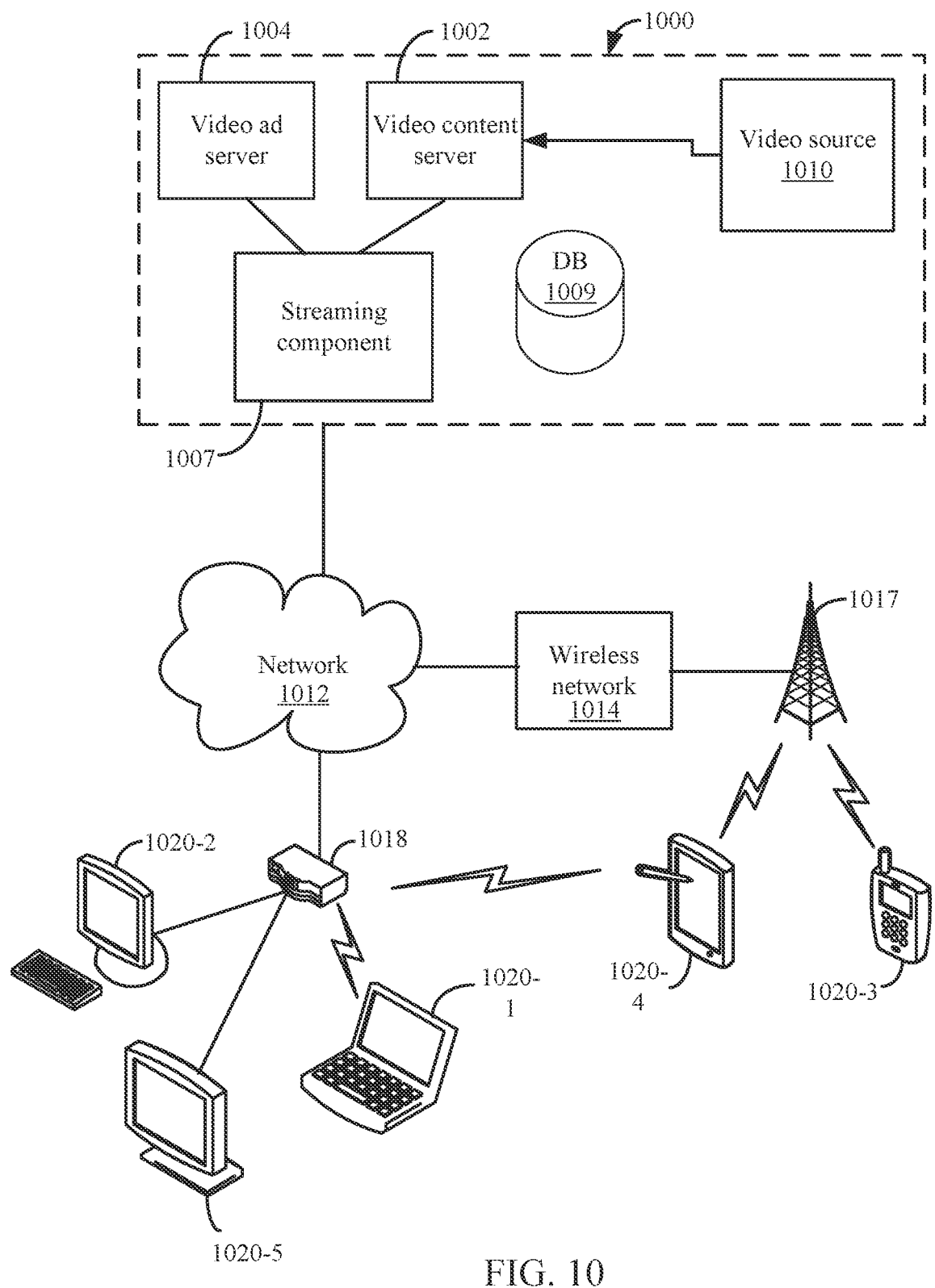
FIG. 10 depicts a video streaming system in communication with multiple client devices via one or more communication networks according to one embodiment.

In some embodiments, an apparatus comprising: one or more computer processors; and a non-transitory computer-readable storage medium comprising instructions, that when executed, control the one or more computer processors to be operable for: receiving an input for an application in which content is displayed in a user interface; receiving an input classification that classifies the input in one of a plurality of input classifications; selecting a user interface format from a plurality of user interface formats based on the input classification; selecting content for the user interface format; and causing output of the content in the user interface format on the user interface System Features and aspects as disclosed herein may be implemented in conjunction with a video streaming system 1000 in communication with multiple client devices via one or more communication networks as shown in FIG. 10. Aspects of the video streaming system 1000 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1000, video data may be obtained from one or more sources for example, from a video source 1010, for use as input to a video content server 1002. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1000 may include one or more computer servers or modules 1002, 1004, and/or 1007 distributed over one or more computers. Each server 1002, 1004, 1007 may include, or may be operatively coupled to, one or more data stores 1009, for example databases, indexes, files, or other data structures. A video content server 1002 may access a data store (not shown) of various video segments. The video content server 1002 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1004 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 1000, a public service message, or some other information. The video advertising server 1004 may serve the video advertising segments as directed by a user interface controller (not shown).

The video streaming system 1000 may further include an integration and streaming component 1007 that integrates video content and video advertising into a streaming video segment. For example, streaming component 1007 may be a content server or streaming media server. A controller (not shown) may determine the selection or configuration of advertising in the streaming video based on any suitable algorithm or process. The video streaming system 1000 may include other modules or units not depicted in FIG. 10, for example, administrative servers, commerce servers, network infrastructure, advertising selection engines, and so forth.

The video streaming system 1000 may connect to a data communication network 1012. A data communication network 1012 may comprise a local area network (LAN), a wide area network (WAN), for example, the Internet, a telephone network, a wireless cellular telecommunications network (WCS) 1014, or some combination of these or similar networks.

One or more client devices 1020 may be in communication with the video streaming system 1000, via the data communication network 1012, wireless cellular telecommunications network 1014, and/or another network. Such client devices may include, for example, one or more laptop computers 1020-1, desktop computers 1020-2, "smart" mobile phones 1020-3, tablet devices 1020-4, network-enabled televisions 1020-5, or combinations thereof, via a router 1018 for a LAN, via a base station 1017 for a wireless cellular telecommunications network 1014, or via some other connection. In operation, such client devices 1020 may send and receive data or instructions to the system 1000, in response to user input received from user input devices or other input. In response, the system 1000 may serve video segments and metadata from the data store 1009 responsive to selection of media programs to the client devices 1020. Client devices 1020 may output the video content from the streaming video segment in a media player using a display screen, projector, or other video output device, and receive user input for interacting with the video content.

Distribution of audio-video data may be implemented from streaming component 1007 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1007 may communicate with client device 1020 using control messages and data messages to adjust to changing network conditions as the video is played. These control messages can include commands for enabling control functions such as fast forward, fast reverse, pausing, or seeking to a particular part of the file at the client.

Since streaming component 1007 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1007 may use TCP-based protocols, such as HTTP and Real Time Messaging Protocol (RTMP). Streaming component 1007 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 11:
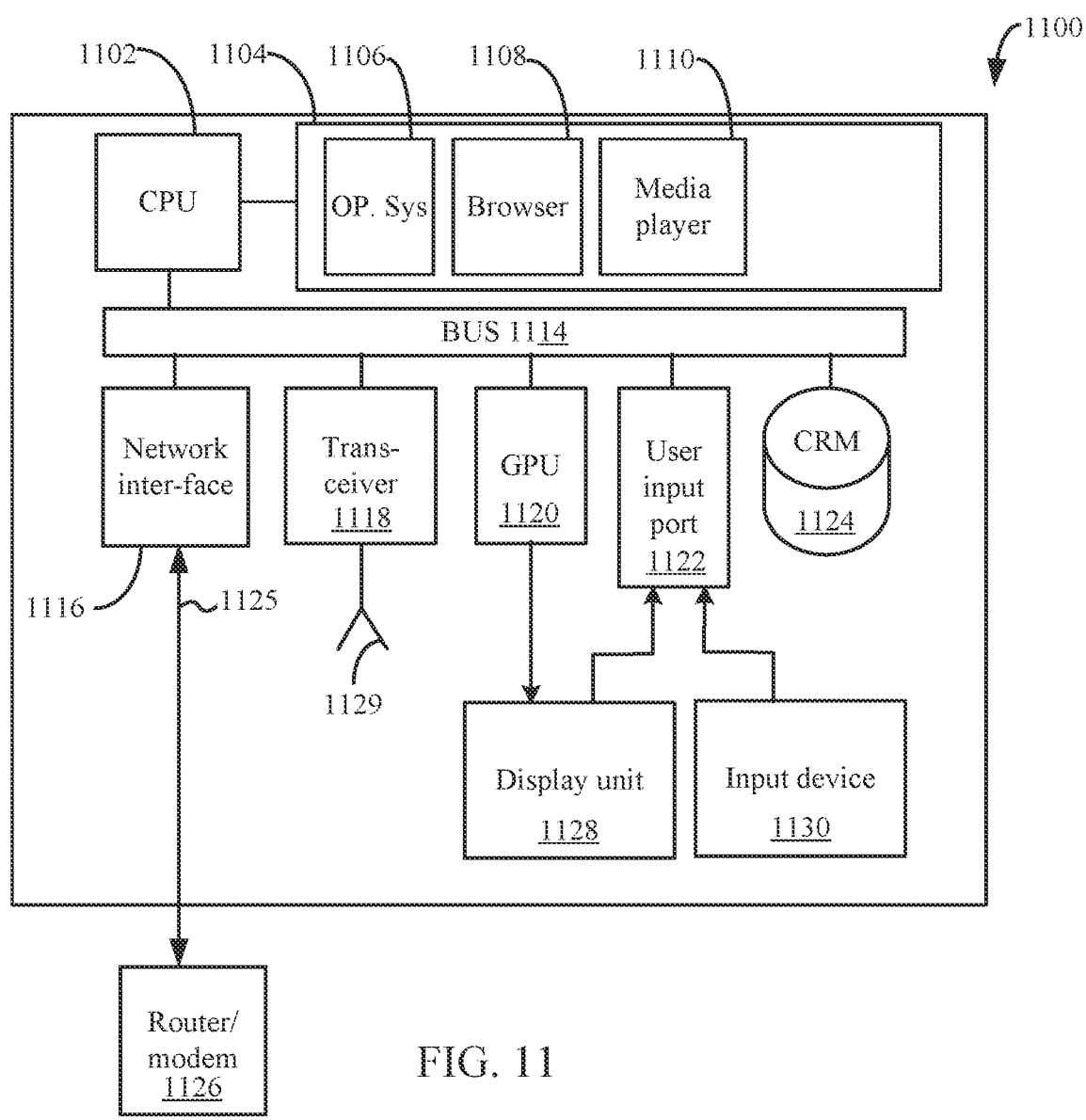
FIG. 11 depicts a diagrammatic view of an apparatus for viewing video content and advertisements.

Referring to FIG. 11, a diagrammatic view of an apparatus 1100 for viewing video content and advertisements is illustrated. In selected embodiments, the apparatus 1100 may include a processor (CPU) 1102 operatively coupled to a processor memory 1104, which holds binary-coded functional modules for execution by the processor 1102. Such functional modules may include an operating system 1106 for handling system functions such as input/output and memory access, a browser 1108 to display web pages, and media player 1110 for playing video. The memory 1104 may hold additional modules not shown in FIG. 11, for example modules for performing other operations described elsewhere herein.

A bus 1114 or other communication component may support communication of information within the apparatus 1100. The processor 1102 may be a specialized or dedicated microprocessor configured or operable to perform particular tasks in accordance with the features and aspects disclosed herein by executing machine-readable software code defining the particular tasks. Processor memory 1104 (e.g., random access memory (RAM) or other dynamic storage device) may be connected to the bus 1114 or directly to the processor 1102, and store information and instructions to be executed by a processor 1102. The memory 1104 may also store temporary variables or other intermediate information during execution of such instructions.

A computer-readable medium in a storage device 1124 may be connected to the bus 1114 and store static information and instructions for the processor 1102; for example, the storage device (CRM) 1124 may store the modules 1106, 1108, 1110 and 1112 when the apparatus 1100 is powered off, from which the modules may be loaded into the processor memory 1104 when the apparatus 1100 is powered up. The storage device 1124 may include a non-transitory computer-readable storage medium holding information, instructions, or some combination thereof, for example instructions that when executed by the processor 1102, cause the apparatus 1100 to be configured or operable to perform one or more operations of a method as described herein.

A communication interface 1116 may also be connected to the bus 1114. The communication interface 1116 may provide or support two-way data communication between the apparatus 1100 and one or more external devices, e.g., the streaming system 1000, optionally via a router/modem 1126 and a wired or wireless connection. In the alternative, or in addition, the apparatus 1100 may include a transceiver 1118 connected to an antenna 1129, through which the apparatus 1100 may communicate wirelessly with a base station for a wireless communication system or with the router/modem 1126. In the alternative, the apparatus 1100 may communicate with a video streaming system 1000 via a local area network, virtual private network, or other network. In another alternative, the apparatus 1100 may be incorporated as a module or component of the system 1000 and communicate with other components via the bus 1114 or by some other modality.

The apparatus 1100 may be connected (e.g., via the bus 1114 and graphics processing unit 1120) to a display unit 1128. A display 1128 may include any suitable configuration for displaying information to an operator of the apparatus 1100. For example, a display 1128 may include or utilize a liquid crystal display (LCD), touchscreen LCD (e.g., capacitive display), light emitting diode (LED) display, projector, or other display device to present information to a user of the apparatus 1100 in a visual display.

One or more input devices 1130 (e.g., an alphanumeric keyboard, microphone, keypad, remote controller, game controller, camera, or camera array) may be connected to the bus 1114 via a user input port 1122 to communicate information and commands to the apparatus 1100. In selected embodiments, an input device 1130 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1128, for example using a touch sensitive screen. A cursor control device may communicate direction information and command selections to the processor 1102 and control cursor movement on the display 1128. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving, by a computing device, an input for a user interface;
   determining, by the computing device, whether an input classification that classifies the input in one of a plurality of input classifications is included with the input;
   when the input classification is not included with the input, performing:
     determining, by the computing device, an input classification for the input; and
     sending, by the computing device, the determined input classification and the input to a server system;
   when the input classification is included with the input, sending, by the computing device, the input and the input classification that is included with the input to the server system;
   receiving, by the computing device, a user interface format that is based on the input classification from the server system; and
   causing, by the computing device, output of content in the user interface format on the user interface.

2. The method of claim 1, wherein determining the input classification for the input comprises:
   determining the input classification from a plurality of input classifications.

3. The method of claim 2, wherein the input classifications in the plurality of input classifications correspond to a plurality of input types.

4. The method of claim 3, wherein input types in the plurality of input types correspond to a plurality of input devices in which input can be received.

5. The method of claim 1, wherein the input classification is received from an input device that received the input.

6. The method of claim 1, wherein when the input classification is included with the input, the input has the input classification added by an input device that received the input.

7. The method of claim 1, wherein the user interface format is from a plurality of user interface formats.

8. The method of claim 1, wherein determining the input classification for the input comprises:
   detects an input type from an input device that received the input.

9. The method of claim 1, wherein determining the input classification for the input comprises:
   using an interface in which the input is received to determine the input classification, wherein different interfaces are used to receive different input types.

10. The method of claim 1, wherein determining the input classification for the input comprises:
    analyzing content of the input to determine the input classification.

11. A non-transitory computer-readable storage medium containing instructions, that when executed, control a computer system to be operable for:
    receiving, by a computing device, an input for a user interface;
    determining, by the computing device, whether an input classification that classifies the input in one of a plurality of input classifications is included with the input;
    when the input classification is not included with the input, performing:
        determining, by the computing device, an input classification for the input; and
        sending, by the computing device, the determined input classification and the input to a server system;
    when the input classification is included with the input, sending, by the computing device, the input and the input classification that is included with the input to the server system;
    receiving, by the computing device, a user interface format that is based on the input classification from the server system; and
    causing, by the computing device, output of content in the user interface format on the user interface.

12. A method comprising:
    receiving, by a computing device, an input for a user interface;
    determining, by the computing device, whether an input classification is included with the input;
    when the input classification is included with the input, selecting, by the computing device, a user interface format based on the input classification;
    when the input classification is not included with the input, selecting, by the computing device, a user interface format without using an input classification;
    selecting, by the computing device, content for the user interface format; and
    sending the content and the user interface format for output on the user interface.

13. The method of claim 12, wherein when the input classification is included, the method further comprises:
    determining whether to use the input classification that is included with the input;
    when the input classification should be used, selecting the content using the input classification; and
    when the input classification should not be used, selecting the content without using the input classification that is included with the input.

14. The method of claim 13, wherein when the input classification should not be used, the method further comprising:
    determining if a period of time has elapsed since a last change of the user interface format; and
    not using the input classification if the period of time has not elapsed.

15. The method of claim 13, wherein when the input classification should not be used, the method further comprising:
    determining if a period of time has elapsed since a last change of the user interface format; and
    not using the input classification if the period of time has not elapsed.

16. The method of claim 12, wherein selecting the content for the user interface format comprises:
    determining a page of content from a plurality of pages of content that is associated with the user interface format, wherein each page of content in the plurality of pages of content is associated with a user interface format in a plurality of user interface formats.

17. The method of claim 12, wherein:
    the content is selected from eligible content for the input, and
    each user interface format in a plurality of user interface formats selects different content from the eligible content.

18. The method of claim 12, wherein selecting the user interface format based on the input classification comprises:
    predicting the user interface format based on the input classification.

19. The method of claim 12, wherein the input classification corresponds to a first user interface format, and wherein selecting the user interface format based on the input classification comprises:
    predicting a second user interface format to use for the input, wherein the second user interface format is different from the first interface format.

20. The method of claim 12, wherein selecting the user interface format without using the input classification comprises:
    using a default user interface format.

* * * * *